Aug. 22, 1933.　　　J. N. WHITEHOUSE　　　1,923,522
REFRIGERATOR DEVICE

Filed Oct. 23, 1931

INVENTOR
John N. Whitehouse
BY Ramsey & Kent
his ATTORNEYS

Patented Aug. 22, 1933

1,923,522

UNITED STATES PATENT OFFICE 1,923,522

REFRIGERATOR DEVICE

John N. Whitehouse, New York, N. Y.

Application October 23, 1931. Serial No. 570,694

4 Claims. (Cl. 62—1)

This invention relates to a new article of manufacture which is to be used as a substitute for cubes or pieces of ice ordinarily employed for the cooling of beverages. There are a number of objections to the present day practice, probably the most important being the fact that it involves undesirable dilution of the beverage and the possibility of contamination. An attempt has been made to overcome this objection by using a small container, of metal, in which is sealed up a quantity of water or other readily freezable liquid, which is then frozen in the container, the container with its solid frozen contents being then placed in the beverage after the fashion of a piece of ice. This solution of the problem is not satisfactory because of the liability of exterior corrosion of the metal and consequent contamination of the beverage; because if the metal container be dropped carelessly into a beverage glass there is liability of breakage of the relative fragile glass; because the container cannot be filled to capacity on account of expansion of its contained water in freezing, and, therefore, great care must be used in filling the container; and because metal is expensive.

It is an object of my invention to provide a substitute for the ordinary ice cube which may be used over and over again, which is cheap to manufacture, and free from the danger of breakage, and which simulates the appearance of natural ice.

These objects I accomplish by means of the device hereinafter described and claimed, with reference to the accompanying drawing, in which:

Figure 1:
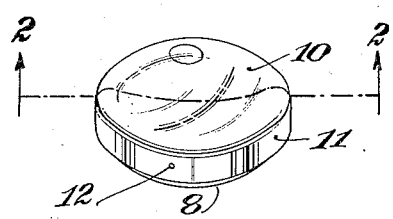
Fig. 1 is a view of a container made in accordance with my invention, filled with water or other freezable liquid, as the container appears before the contained liquid has been frozen.
Figure 3:
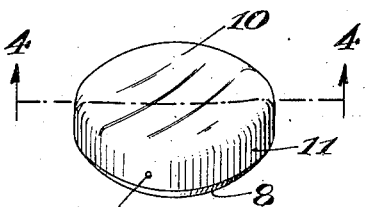
Fig. 3 is a view similar to Fig. 1, showing the appearance of the article after freezing of the contained liquid has occurred.
Figure 2:
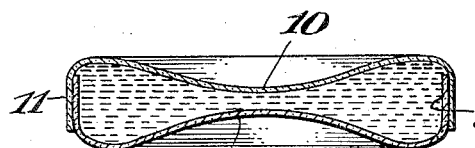
Fig. 2 is a sectional view on the line 2—2 of Fig. 1.
Figure 4:
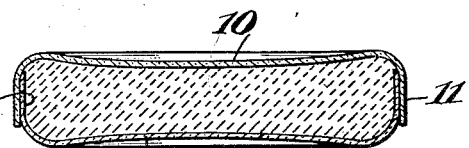
Fig. 4 is a sectional view taken on the line 4—4 of Fig. 3.
Figure 5:
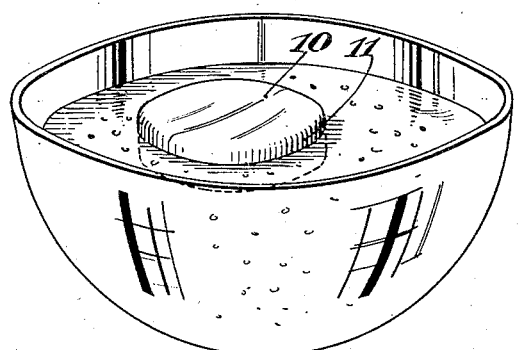
Fig. 5 shows a glass of beverage with one of the articles illustrated in Figs. 3 and 4 dropped into it.
Figure 6:
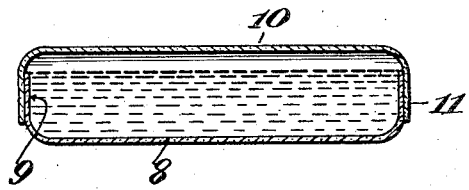
Fig. 6 is a view similar to Fig. 2 illustrating a modification.

Referring to the numerals on the drawing, and particularly to Figs. 1 to 5 inclusive, there is shown in these figures a container preferably made of substantially transparent thin celluloid. This container may conveniently be made in the familiar pill-box form, comprising a lower section having a bottom 8 and side flange 9, and a similarly shaped cover comprising a top 10 and side flange 11, the parts being so shaped and proportioned that the cover flange fits over the flange of the lower section snugly. The contacting surfaces of the respective flanges are bound together, as by the introduction between them of some celluloid solvent, with the result that there is produced a box or container which is substantially one piece and homogeneous throughout and hermetically sealed. For reasons which will hereafter appear, it is preferred that the bottom section 8 and the cover section 10 shall be initially concaved towards the interior of the box, and a filling hole 12 is provided through some wall of the container, this filling hole being shown as penetrating the overlapped flanges 9 and 11. Through this hole 12 water or other freezable liquid is introduced into the interior of the container, preferably only to such an amount as that the container will be completely filled without causing any expansion or change of position of the container walls, though it will be apparent that if any slight excess of liquid be introduced no harm will be done. The container being full of liquid, the filler hole is sealed up as by means of a plug of celluloid, is made homogeneous with the material of the box as by means of celluloid solvent, in an obvious manner. The article thus far described (Fig. 2) is now subjected to a freezing temperature, as, for example, in a mechanical refrigerator, so that the contained liquid freezes. The freezing operation of course results in expansion, and at the end of the freezing operation the article has assumed the appearance illustrated in Fig. 4, that is to say, the concavity of the bottom 8 and cover section 10 has been decreased, without any rupture of the container wall. The article thus ready for use may be dropped into a glass of beverage, as suggested by the showing of Fig. 5, and will cool the beverage without any possibility of diluting the same, because, as explained, the water resulting from the melting of the ice cannot escape from the container. The celluloid from which the container is made is chosen, so far as its color and/or transparency and other visual qualities are concerned, so that when the article is floating or submerged in a beverage it will simulate in greater or less degree the appearance of natural ice. And the container, because of its relatively thin walls and naturally flexible condition, will not endanger the beverage glass even if carelessly handled.

If desired, the container, instead of having special provision for expansion, may have initially flat top and bottom walls, without any provision for expansion (other than what is inherent in the celluloid itself). Such a box or container will preferably be supplied with water short of its capacity, leaving within the container an unfilled space which is greater than the volume differential between the frozen and unfrozen water.

Figure 7:
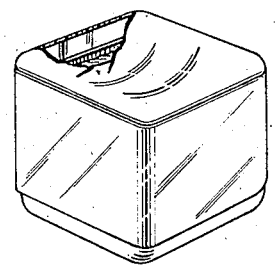
Fig. 7 illustrates in perspective, with parts broken away, a modification of the article so far as the matter of shape is concerned.

In Fig. 7 I have illustrated an article which is in general similar to that illustrated in Figs. 1 to 5 inclusive, except that it is more nearly cubical in form.

The celluloid or other relatively flexible plastic material used in manufacturing my device will be odorless, substantially incapable of imparting any undesirable taste to a beverage in which it may be placed, and chemically inert to the constituents of any beverage in which it is intended to be used. If desired, of course, the celluloid may be colored, or the contained water may carry some harmless coloring. In any case the liquid within the container must be inocuous so that if for any reason a rupture of the container should occur, the discharge of its contents into a beverage would do no harm.

I consider that the following are distinguishing features of my invention:

1. The walls of the article in its unfrozen state are everywhere yielding, so that in case of accidental dropping the danger of breakage is substantially eliminated, both as to the article itself and as to anything with which it may come in contact.

2. Because of the inherent elasticity of the container and/or the special provision which is made for change of shape to allow for expansion of its contents, there is no danger of rupture due to such freezing, and the volume of liquid introduced into the container need not be controlled within limits that might be impractical in commercial manufacture.

3. Because of the readily variable characteristics of translucency, transparency, color, etc., the article may be made to suit the beverage with which it is to be used, so far as visual effects are concerned.

4. The article is inexpensive to make, may be used over and over again, and may be readily embossed or otherwise treated to make of it, incidentally, an advertising medium.

5. The term "celluloid" is used herein in its general meaning in which it designates plastic cellulose base materials capable of being molded and capable of being united with a solvent. In making such materials the cellulose is usually either acetated or nitrated, but it may be otherwise treated.

As a new article of manufacture, I claim:

1. A sealed container having therein a readily freezable liquid, the walls of said container being made of translucent celluloid sufficiently thin to exhibit marked flexibility and elasticity characteristics.

2. The article set forth in claim 1, in which the container is of pill-box construction in two sections with overlapping flanges sealed together with a sealed joint, and with two opposed main walls, one of which is concaved.

3. The article set forth in claim 1, in which the container is of pill-box construction in two sections with overlapping flanges sealed together with a sealed joint.

4. The article set forth in claim 1, with two opposed main walls, one of which is concaved.

JOHN N. WHITEHOUSE.